Patented May 31, 1932

1,861,319

UNITED STATES PATENT OFFICE

JULIUS PEYER, OF BASEL, SWITZERLAND, ASSIGNOR TO CHEMICAL WORKS FORMERLY SANDOZ, OF BASEL, SWITZERLAND

PROCESS FOR THE PREPARATION OF GALL ACIDS

No Drawing. Application filed April 14, 1927, Serial No. 183,909, and in Germany April 24, 1926.

One of the principal difficulties of the isolation of the gall acids from the saponification product of their compounds with glycocoll and taurine, as contained in the natural gall, consists in the separation of the fatty acids, which are simultaneously formed during the saponification. Reference to this point is often made in literature; the German patent specification No. 321,699 for instance states explicitly this fact. The fatty acids admixed with the gall acids and precipitated with them, are considered as being a serious hinderance to the crystallization. The success of the process as described in the German Patent No. 321,699 consists mainly in that, contrarily to the older processes, the fatty acids are separated in a simple manner, by shaking them out with an organic solvent, during the precipitation of the gall acids. The said specification states explicitly that an extraction of the fatty acids from the raw gall acids is impossible, owing to their resinous consistency, which prevents the solvent from penetrating thereinto, whereby this statement relates to the product which has been obtained by precipitating the gall acids together with the fatty acids.

On the other hand, the colored substances contained in the gall, such as biliverdine and bilirubine, form further disagreeable impurities, which adhere to the gall acids as prepared according to the process of the German Patent No. 321,699 and which must be separated by further purifying operations.

Now, according to the present process it is rendered possible to separate in one single very simple operation the fatty acids as well as the greatest quantity of the colored gall substances.

Contrarily to the statement of the above mentioned German patent, it is possible under the new working conditions to extract the fatty acids as well as the colored substances also from raw gall acids which have been precipitated in the usual manner with acids. This can be effected, if the first resinous and deeply colored raw product is added to a well stirred mixture of a fatty acid solvent and an aqueous solution or suspension of a salt of a weak acid (e. g. sodium acetate, sodium sulphite, sodium bisulphite, sodium cholate, calcium carbonate etc.). The organic solvent takes up the fatty acids together with the colored substances from the raw product, which is stated in the above German patent as not being extractable. After a short time of stirring the gall acids are separated as a weakly yellowish fine crystalline powder, which can easily be filtered off and washed with fat solvent and warm water. By treating the dried product, which consists of a mixture of the different gall acids, with 1½ times its volume of alcohol, almost 75% of cholic acid is obtained, being in a nearly chemically pure state. The product shows, after recrystallization from four to five times its weight of alcohol and by decoloration with charcoal, the melting point of 196°–197° C. Further, it has been found that a gall acid raw product is obtainable, which can easily be purified from admixed fatty acids and colored substances, without salts of weak acids having to be added to the aqueous suspension with a suitable organic solvent, if even the precipitation from the saponification product is effected in the presence of a convenient salt of a weak acid, whereby these salts can be added as such or be formed with the alkali used for the saponification, with a weak acid or in cautiously avoiding during the precipitation any local excess of mineral acid. In the latter manner of performance, the gall acid salts take the role of salts of weak acids. The mineral acid eventually precipitated must be neutralized. On this neutralization of the enclosed mineral acid, the intermediary gall acid salts at first formed act as salts of weak acids in the above described sense. A gall acid as obtained in the process described above, from which the fatty acids and colored substances can so easily be extracted with organic solvents, has up to now never been described. The new working conditions, which lead to its preparation must, therefore, be considered as a progress in the domain of the isolation of gall acids.

*Example*

100 kg. of concentrated commercial ox gall are saponified in the usual manner by boiling them for twenty hours with 150 kg. of caustic soda of 10% strength. The mass is then diluted by an equal volume of water, then the free alkali is neutralized with dilute hydrochloric acid to such an extent as not yet to allow free gall acids to be precipitated. The solution is then filtered from undissolved admixtures and thereupon slowly acidulated with hydrochloric acid under vigorous stirring until congo paper changes to blue. The gall acids are then precipitated with the fatty acids together with the greater part of the colored substances of the gall as a deeply greenish to deeply brownish colored pasty mass. This mass is then introduced under vigorous stirring into a mixture of 4 kg. of sodium acetate, of 100 kg. of water and of 100 kg. of toluene, the mixture being warmed to about 40–50° C. After half an hour the toluene has become deeply colored. It has taken up the colored substances and fatty acids, whilst the gall acids remain as a fine crystalline suspension of a slight gray, greenish or yellowish color. This suspension is filtered off, washed with some toluene and warm water and dried in vacuo at a low temperature. The product thus treated is then boiled with 1½ times its weight of alcohol, whereby a nearly pure cholic acid is obtained. If this product is recrystallized from 4–5 times its weight of alcohol, while being decolored by charcoal, pure cholic acid of the melting point 196–197° C. can be obtained.

A similar result can also be obtained, if after the saponification is finished, a part of the alkali used is neutralized with a weak acid, for example acetic acid, to thus form the alkali acetate. The solution is then cautiously treated with a strong acid, while avoiding an acid reaction on congo paper, until the precipitation of the gall acids is finished. The product thus obtained is then extracted as above described with a fatty acid solvent to eliminate the fatty acids and colored substances.

What I claim is:

A process for the preparation of gall acids, consisting in first precipitating with acids the gall acids from a saponification product of gall and then treating same with a mixture of a fatty acid solvent, which does not dissolve cholic acid, and an aqueous solution of a salt of a weak acid having an acidity similar to cholic acid and which does not possess an alkaline reaction.

In witness whereof I have hereunto signed my name this 1st day of April, 1927.

JULIUS PEYER.